US012445777B2

(12) United States Patent
Haggai et al.

(10) Patent No.: US 12,445,777 B2
(45) Date of Patent: Oct. 14, 2025

(54) METHODS AND ARRANGEMENTS FOR A BROADCAST AUDIO RECEIVER FEEDBACK CHANNEL

(71) Applicant: Intel Corporation, Santa Clara, CA (US)

(72) Inventors: Oren Haggai, Kefar Sava (IL);
Balvinder pal Singh, Bhilai (IN);
Noam Ginsburg, Portland, OR (US);
Arnaud Pierres, Menlo Park, CA (US);
Robert D. Hughes, Tualatin, OR (US);
Harish Balasubramaniam, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 17/561,483

(22) Filed: Dec. 23, 2021

(65) Prior Publication Data

US 2022/0116711 A1 Apr. 14, 2022

(51) Int. Cl.
*H04R 5/04* (2006.01)
*G06F 3/16* (2006.01)

(52) U.S. Cl.
CPC .............. *H04R 5/04* (2013.01); *G06F 3/165* (2013.01); *G06F 3/167* (2013.01); *H04R 2420/07* (2013.01); *H04R 2499/11* (2013.01)

(58) Field of Classification Search
None
See application file for complete search history.

(56) References Cited

U.S. PATENT DOCUMENTS

| 2013/0102251 | A1* | 4/2013 | Linde | H04L 1/1887 |
| | | | | 455/41.2 |
| 2019/0104423 | A1* | 4/2019 | Hariharan | H04L 1/1621 |
| 2020/0396028 | A1* | 12/2020 | Haartsen | H04L 69/40 |

\* cited by examiner

*Primary Examiner* — Hemant S Patel
(74) *Attorney, Agent, or Firm* — KDW FIRM PLLC

(57) ABSTRACT

Logic to cause transmission of an audio protocol data unit (PDU) during each of the one or more subevents. Logic to generate a feedback request frame as a feedback request PDU. Logic to cause transmission of the feedback request PDU on a feedback channel. Logic to scan the feedback channel for one or more feedback response PDUs transmitted in response to transmission of the feedback request PDU. Logic to modify the one or more parameters of transmission of the audio PDUs in a subsequent broadcast isochronous group (BIG) event based on the one or more feedback response PDUs. Logic to receive of an audio PDU during each of the one or more subevents. Logic to receive the feedback request PDU on a feedback channel. Logic to generate a feedback response PDU in response. And logic to cause transmission of the feedback response PDU on the feedback channel.

25 Claims, 11 Drawing Sheets

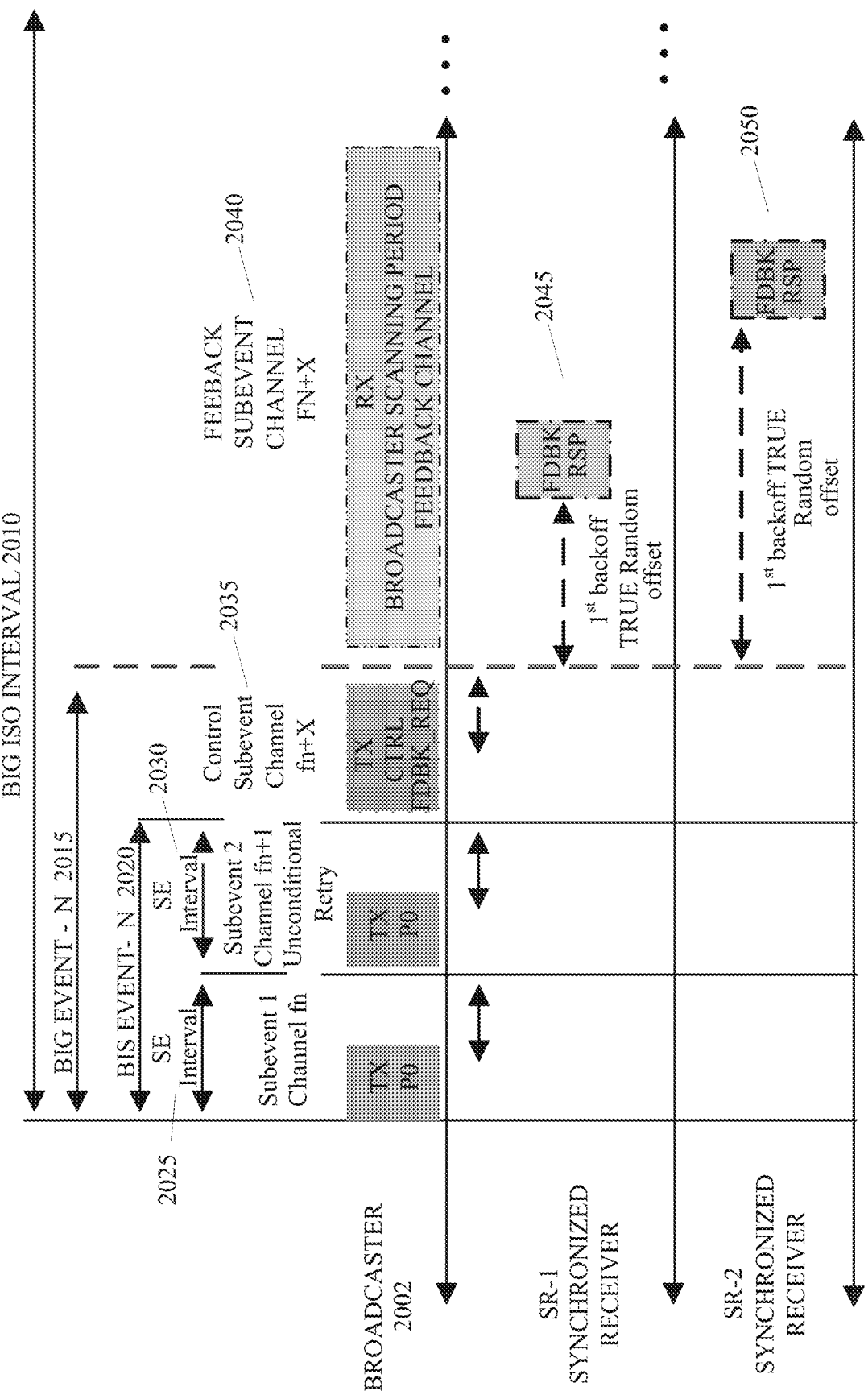

METHODS AND ARRANGEMENTS FOR A BROADCAST AUDIO RECEIVER FEEDBACK CHANNEL

TECHNICAL FIELD

This disclosure generally relates to systems and methods for wireless communications and, more particularly, involve establishment of a feedback channel such as Bluetooth broadcast audio feedback channel.

BACKGROUND

Bluetooth introduces the capability to add audio to Low Energy Bluetooth. Two main audio transports are added: Unicast Audio and Broadcast Audio. Broadcast Audio is adding the capability for a single device, known as the Broadcaster, to distribute audio over the air to an unlimited number of synchronized receivers. The communication is unidirectional from one Broadcaster to the synchronized receivers. The Broadcaster uses an arbitrary power level when transmitting audio. The Broadcaster selects the Adaptive Frequency Hopping (AFH) channel map, based on open loop self-assessment of channel conditions. These decisions made by the Broadcaster are not taking into the account the channel condition at the synchronized receivers, which may be further away. The result is poor audio quality and poor user experience, due to sub-optimal power levels, channel selection, which exhibits poor audio reception, and increased power consumption of the audio peripherals.

Using arbitrary power level in Broadcast of audio data results in poor user experience. Receivers such as ear buds or speakers which are further away from the Broadcaster, requires higher power levels. While when receivers are closer to the Broadcaster will have better performance with medium power levels. For receivers which are very close to the Broadcaster, a too high-power level saturates the LNA (Low Noise Amplifiers), and results in reception failures. Reception failures in turn cause increased battery consumption due to receiver staying awake to receive additional unconditional retries which are set by the Broadcaster.

Moreover, due to their different position, these devices require a different set of AFH channels. When the Broadcaster selects the AFH channel map based on its position alone, the results are fades and glitches in audio at the synchronized receiver side, when non optimal RF channels are used.

BRIEF DESCRIPTION OF THE DRAWINGS

FIG. 2 depicts a communications timeline with a single stream known as a BIS (Broadcast Isochronous Stream) for a Broadcaster and a synchronized receiver, SR-1, according to embodiments.

DETAILED DESCRIPTION OF EMBODIMENTS

Figure 1A:
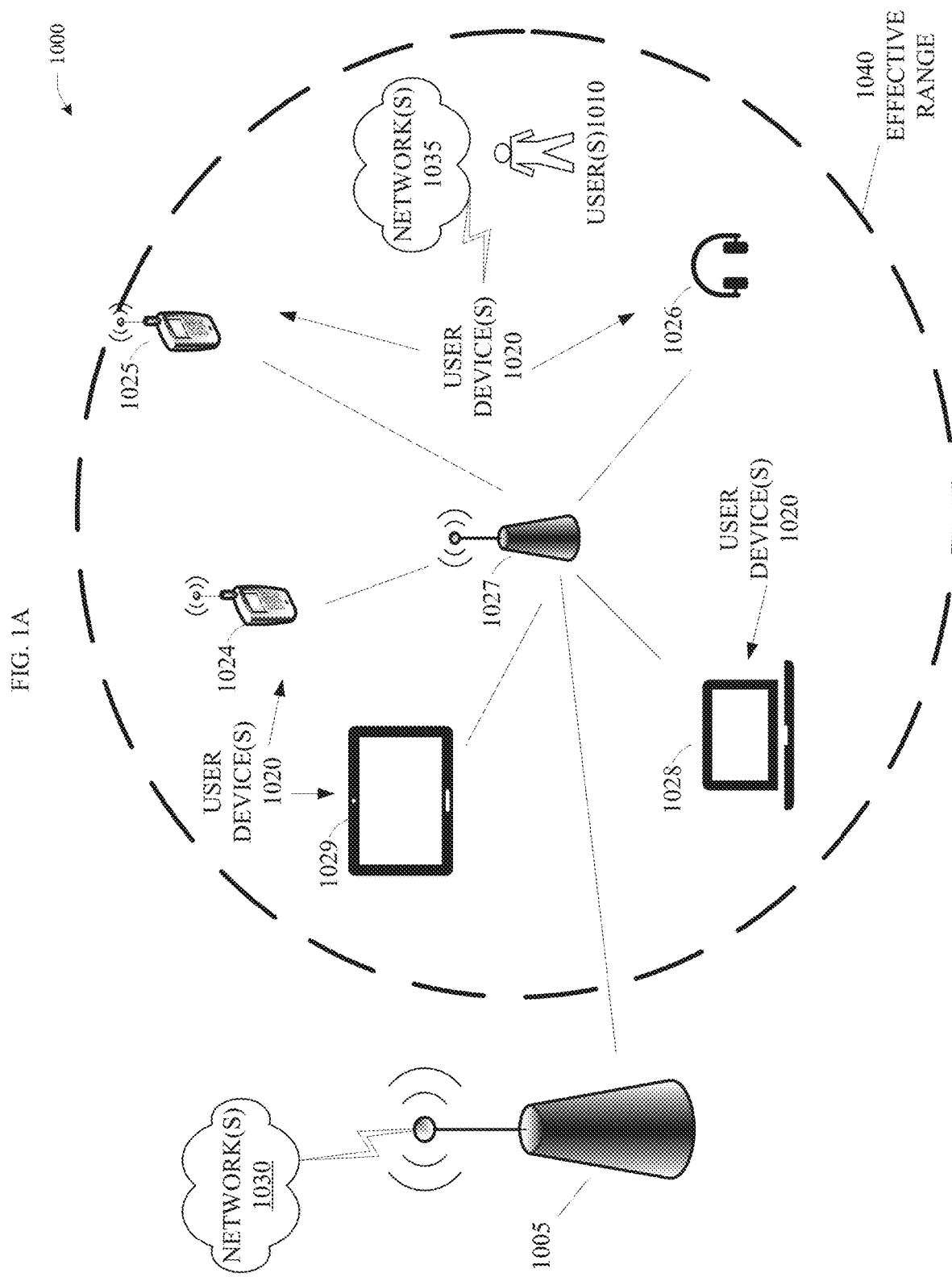
FIG. 1A depicts a system diagram illustrating an embodiment of a network environment for feedback logic circuitry, in accordance with one or more example embodiments.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Embodiments may receive feedback provided by remote receivers on reception level status metrics referred to herein as FDBK RESP based on broadcast communications such as broadcast audio protocol data units (PDUs). In some embodiments, the broadcaster may broadcast a feedback request PDU to receivers after broadcasting an audio PDU and establish a feedback channel for receivers to provide feedback. The broadcaster may listen or scan the feedback channel for feedback response PDUs.

The feedback may contain metrics such as RSSI (receive signal strength indication), PER (Packet Error Rate), and AFH channel map classifications (Adaptive Frequency Hopping). With the FDBK collected from multiple receivers, the broadcaster may determine what power level to use when broadcasting music, voice, and/or the like, and what set of RF channels to use (also known as AFH channel map, Adaptive Frequency Hopping).

Embodiments herein may add the feedback channel next to a Control subevent protocol data unit (PDU), in which the broadcaster may scan for FDBK RESP PDU reports sent by various synchronized receivers. The broadcaster may use the same radio frequency (RF) channel (carrier frequency and frequency range) that is used to send the control PDU (FDBK REQ PDU), before scanning for the FDBK RESP PDU reports.

Embodiments may also comprise feedback logic circuitry to facilitate communications by devices in accordance with Bluetooth specifications such as Bluetooth Core specifications 5.3, Bluetooth SIG, Inc., Publication date: 13 Jul. 2021 as well as older Bluetooth specifications such as 3.0, 4.0, and Bluetooth low energy (LE) specifications. Many embodiments also facilitate communications by devices in accordance with different versions of Institute of Electrical and Electronics Engineers (IEEE) 802.11 standards for wireless communications such as IEEE 802.11-2020, December 2020; IEEE P802.11be™/D1.0, May 2021; IEEE P802.11ax™/D8.0, IEEE P802.11ay™/D7.0, IEEE P802.11az™/D3.0, IEEE P802.11ba™/D8.0, IEEE P802.11bb™/D0.4, IEEE P802.11bc™/D1.02, and IEEE P802.11bd™/D1.1.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Various embodiments may be designed to address different technical problems associated with broadcasting audio such Using arbitrary power level in Broadcast of audio data results in poor user experience. Receivers such as ear buds or speakers which are further away from the Broadcaster, requires higher power levels. While when receivers are closer to the Broadcaster will have better performance with medium power levels. For receivers which are very close to the Broadcaster a too high-power level saturates the LNA (Low Noise Amplifiers), and results in reception failures. Reception failures in turn cause increased battery consumption due to receiver staying awake to receive additional unconditional retries which are set by the Broadcaster. Moreover, due to their different position, these devices require a different set of AFH channels. When the Broadcaster selects the AFH channel map based on its position alone, the results are fades and glitches in audio at the synchronized receiver side, when non optimal RF channels are used; and/or the like.

Different technical problems such as those discussed above may be addressed by one or more different embodiments. Embodiments may address one or more of these problems associated with assessment. For instance, some embodiments that address problems associated with resource assessment may do so by one or more different technical means, such as, causing transmission of an audio protocol data unit (PDU) during each of the one or more subevents; generating a feedback request frame as a feedback request PDU; causing transmission of the feedback request PDU on a feedback channel; scanning the feedback channel for one or more feedback response PDUs transmitted in response to transmission of the feedback request PDU; modifying the one or more parameters of transmission of the audio PDUs in a subsequent broadcast isochronous group (BIG) event based on the one or more feedback response PDUs; receiving of an audio protocol data unit (PDU) during each of the one or more subevents; receiving the feedback request PDU on a feedback channel; generating a feedback response PDU in response to transmission of the feedback request PDU; and causing transmission of the feedback response PDU on the feedback channel; and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Some embodiments may facilitate wireless communications in accordance with multiple standards like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

FIG. 1A depicts a system diagram illustrating an embodiment of a network environment for feedback logic circuitry, in accordance with one or more example embodiments. Wireless network 1000 may include one or more user devices 1020 and one or more access points(s) (AP) 1005, which may communicate in accordance with Bluetooth communication standards and/or 802.11 communication standards. The user device(s) 1020 may comprise mobile devices that are non-stationary (e.g., not having fixed locations) and/or stationary devices.

Figure 3:
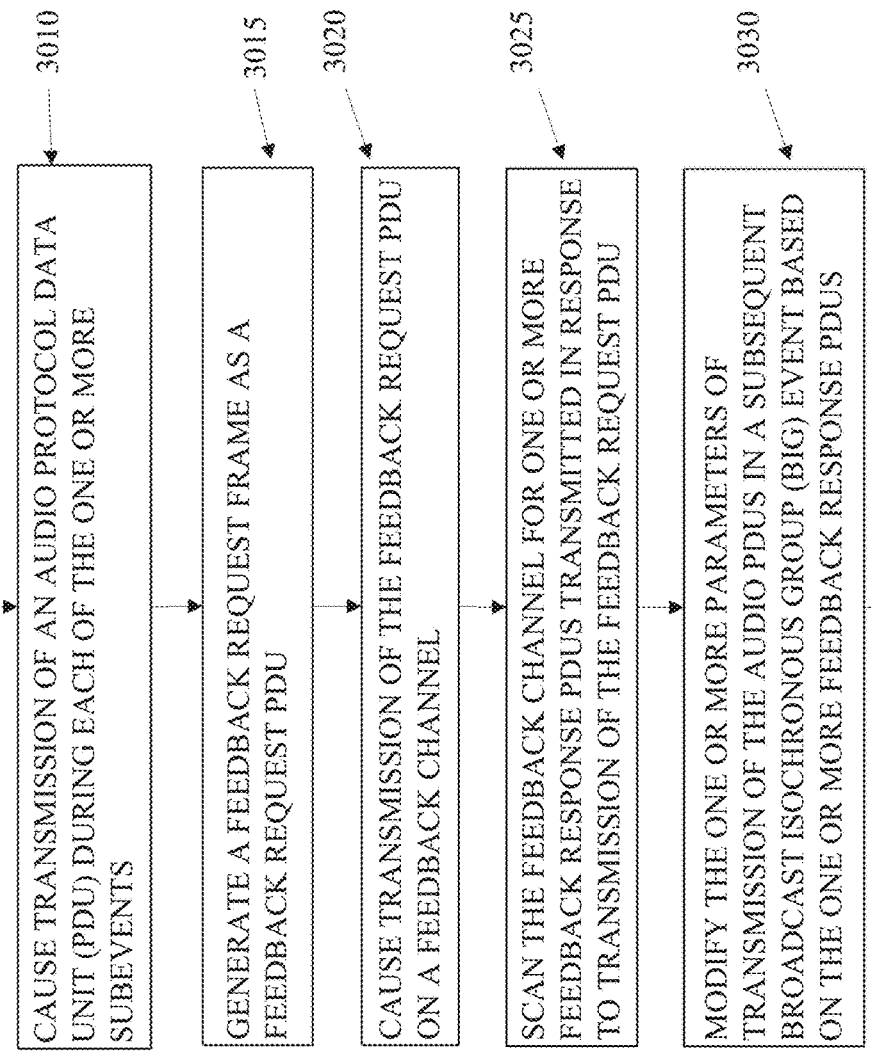
FIG. 3 depicts an embodiment of a flowchart to implement feedback logic circuitry.

In some embodiments, the user device(s) 1020 and the AP(s) 1005 may include one or more computer systems similar to that of the timing diagram of FIG. 3 and/or the example machine/system of FIGS. 5, 6, 7, and 8.

One or more illustrative user device(s) 1020 and/or AP(s) 1005 may be operable by one or more user(s) 1010. It should be noted that any addressable unit may be a station (STA). A STA may take on multiple distinct characteristics, each of which shape its function. For example, a single addressable unit might simultaneously be a Bluetooth low energy (BLE) STA, portable STA, a quality-of-service (QoS) STA, a dependent STA, and a hidden STA. The one or more illustrative user device(s) 1020 and the AP(s) 1005 may be STAs. The one or more illustrative user device(s) 1020 and/or AP(s) 1005 may operate as an extended service set (ESS), a basic service set (BSS), a personal basic service set (PBSS), or a control point/access point (PCP/AP). The user device(s) 1020 (e.g., 1024, 1025, 1026, 1027, 1028, or 1029) and/or AP(s) 1005 may include any suitable processor-driven device including, but not limited to, a mobile device or a non-mobile, e.g., a static device. For example, user device(s) 1020 and/or AP(s) 1005 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless network interface, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

In some embodiments, the user device(s) 1020 and/or AP(s) 1005 may also include mesh stations in, for example, a mesh network, in accordance with one or more IEEE 802.11 standards and/or 3GPP standards.

Any of the user device(s) 1020 (e.g., user devices 1024, 1025, 1026, 1027, 1028, and 1029) and AP(s) 1005 may be configured to communicate with each other via one or more communications networks 1030 and/or 1035 wirelessly or wired. In some embodiments, the user device(s) 1020 may also communicate peer-to-peer or directly with each other, e.g., via Bluetooth, without the AP(s) 1005.

In the present embodiment, the user device, Bluetooth (BT) AP 1027 may comprise an audio streaming service for small areas and/or small groups of users. For example, at a family gathering, a user may wish to synchronize receipt of audio streaming amongst a group of family members. In other situations, the BT AP 1027 may provide audio streaming services for an area within an airport or train station to stream audio information to passengers about arrivals and departures.

The effective range 1040 may represent an area within broadcast distance from the BT AP 1027. The user devices 1020 may include, e.g., receivers that include a mobile phone 1024, a mobile phone 1025, a headset 1026, a laptop 1028, and a tablet 1029 operating on Bluetooth (BT) channels and the broadcaster that operates on BT channels as well as Wi-Fi channels. The mobile phone 1024, mobile phone 1025, headset 1026, laptop 1028, and tablet 1029 may all be subscribers with a service provider for, e.g., streaming audio services.

In the present embodiment, the BT AP 1027 may be a broadcaster and may relay audio streaming received from the service provider via the AP(s) 1005. The BT AP 1027 may broadcast the audio protocol data units (PDUs) for the streaming service via broadcast isochronous stream (BIS) events. Some or all of the BIS events may include a control subevent. The broadcaster, BLE AP 1027, may use control subevent to transmit information related to the audio streaming during the BIS events. In the present embodiment, the BT AP 1027 may also use the control subevent to transmit a feedback request PDU to all synchronized receivers to request feedback about the streaming service such as information about the RSSI, PER, and AFH Channel Map.

In several embodiments, the receivers that include a mobile phone 1024, a mobile phone 1025, a headset 1026, a laptop 1028, and a tablet 1029 may receive the feedback request PDU and may determine whether or not to respond to the feedback request PDU. If the receivers determine to respond, the receivers may generate a random backoff and attempt to transmit the feedback response PDUs in response to the feedback request PDU during the feedback subevent of a BIS event.

Upon receiving the feedback response PDUs, the BT AP 1027 may process the feedback response PDUs to determine adjustments to the power level and channel mapping for broadcasting the audio PDUs starting in a subsequent BIS event.

Any of the communications networks 1030 and/or 1035 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 1030 and/or 1035 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 1030 and/or 1035 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 1020 (e.g., user devices 1024, 1025, 1026, 1027, 1028, and 1029) and AP(s) 1005 may include one or more communications antennas. The one or more communications antennas may be any suitable type of antennas corresponding to the communications protocols used by the user device(s) 1020 (e.g., user devices 1024, 1025, 1026, 1027, 1028, and 1029) and AP(s) 1005. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 1020 and/or AP(s) 1005.

Any of the user device(s) 1020 (e.g., user devices 1024, 1025, 1026, 1027, 1028, and 1029) and AP(s) 1005 may be configured to wirelessly communicate in a wireless network. Any of the user device(s) 1020 (e.g., user devices 1024, 1025, 1026, 1027, 1028, and 1029) and AP(s) 1005 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 1020 (e.g., user devices 1024, 1025, 1026, 1027, 1028, and 1029) and AP(s) 1005 may be configured to perform any given directional transmission towards one or more defined transmit sectors. Any of the user device(s) 1020 (e.g., user devices 1024, 1025, 1026, 1027, 1028, and 1029) and AP(s) 1005 may be configured to perform any given directional reception from one or more defined receive sectors.

MIMO beamforming in a wireless network may be accomplished using RF beamforming and/or digital beamforming. In some embodiments, in performing a given MIMO transmission, user devices 1020 and/or AP(s) 1005 may be configured to use all or a subset of its one or more communications antennas to perform MIMO beamforming.

Any of the user devices 1020 (e.g., user devices 1024, 1025, 1026, 1027, 1028, and 1029) and AP(s) 1005 may include any suitable radio and/or transceiver for transmitting and/or receiving radio frequency (RF) signals in the bandwidth and/or channels corresponding to the communications protocols utilized by any of the user device(s) 1020 and AP(s) 1005 to communicate with each other. The radio components may include hardware and/or software to modulate and/or demodulate communications signals according to pre-established transmission protocols. The radio components may further have hardware and/or software instructions to communicate via Bluetooth protocols such as Bluetooth 5.0 or may communicate via one or more Wi-Fi and/or Wi-Fi direct protocols, as standardized by the Institute of Electrical and Electronics Engineers (IEEE) 802.11 standards. The radio component may include any known receiver and baseband suitable for communicating via the communications protocols. The radio component may further include a power amplifier (PA), a low noise amplifier (LNA), additional signal amplifiers, an analog-to-digital (A/D) converter, one or more buffers, and a digital baseband.

Figure 1B:
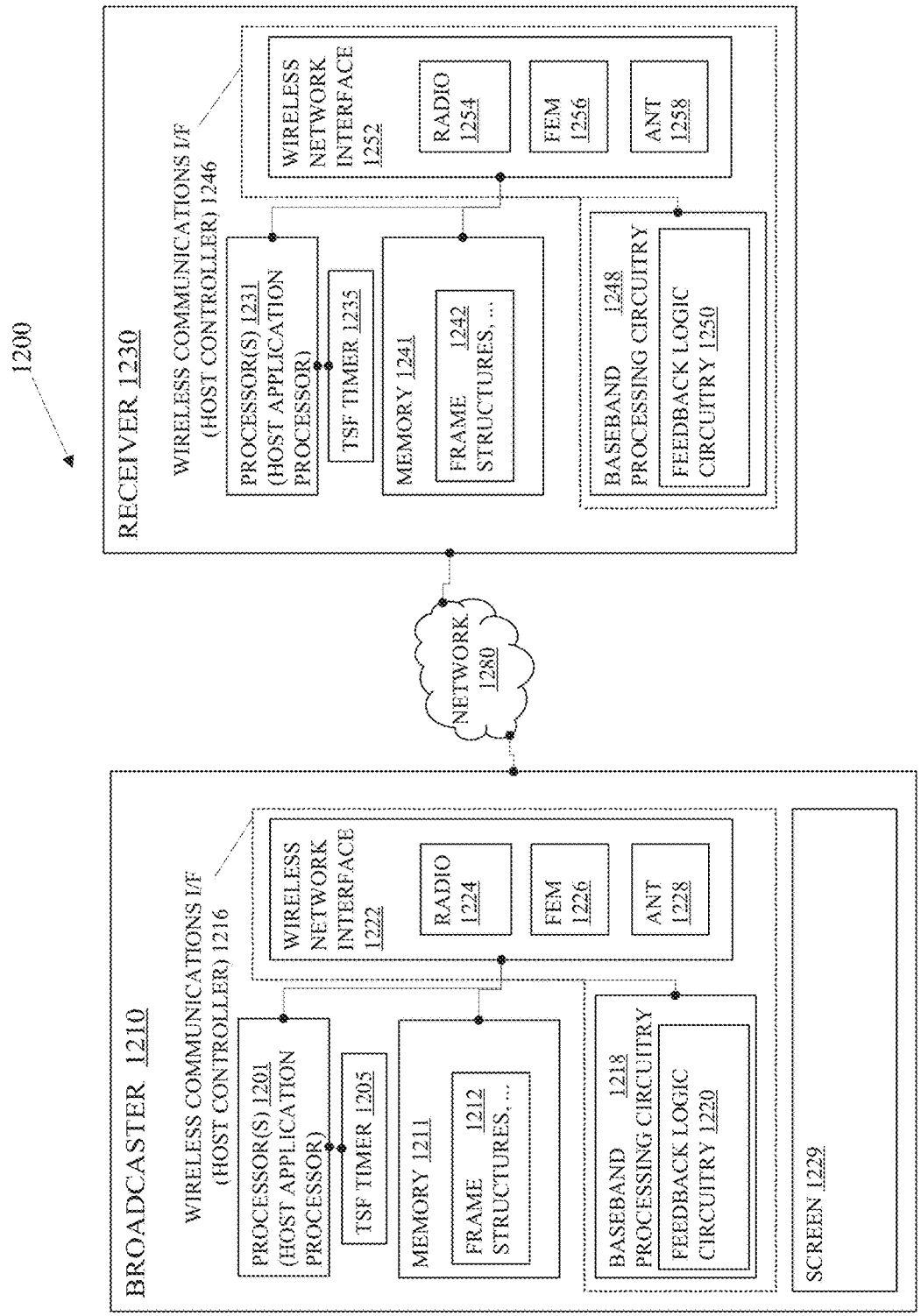
FIG. 1B depicts an embodiment of a system including multiple devices to implement feedback logic circuitry, in accordance with one or more example embodiments.

FIG. 1B depicts an embodiment of a system 1200 including multiple BT devices to implement feedback logic circuitry, in accordance with one or more example embodiments. System 1200 may transmit or receive as well as generate, decode, and interpret transmissions between a broadcaster 1210 and a receiver 1230. The broadcaster 1210 may wirelessly broadcast (transmit) audio protocol data units (PDUs) to the receiver 1230 via a Bluetooth channel such as a 2.4 GHz channel as part of an audio streaming service.

In some embodiments, the broadcaster 1210 and the receiver 1230 may include one or more computer systems similar to that of the example machines/systems of FIGS. 5, 6, 7, and 8.

The receiver 1230 may include feedback logic circuitry, such as the feedback logic circuitry 1220 of broadcaster 1210, to provide feedback to the broadcaster 1210 related to receipt of the audio PDUs broadcast by the broadcaster 1210 via a feedback channel established by the broadcaster 1210 via control subevents scheduled during broadcast isochronous stream (BIS) events on a Bluetooth low energy (BLE) channel (e.g., 2.4 GHz).

The broadcaster 1210 may broadcast a feedback request PDU on the feedback channel during a control subevent and may scan the feedback channel thereafter for feedback responses transmitted by synchronized receivers such as the receiver 1230. The feedback request PDUs may include a duration of the feedback request PDU as well as a duration of a feedback subevent during which the receiver 1230 is requested to respond with a feedback response PDU report. In many embodiments, the receiver 1230 may determine whether or not to respond and determine a random backoff to wait prior to attempting to transmit the feedback response PDU report during the feedback subevent. In some embodiments, the random backoff may factor in whether the receiver 1230 has recently submitted a feedback response during one of the recent feedback subevents. In some embodiments, a recent subevent may be determined based on time elapsed since the last submitted a feedback response. In some embodiments, recent may be during the last 3, 5, 10, or 20 feedback subevents. For instance, the determination about whether to respond may be based on how recently the receiver 1230 submitted a feedback response to reduce feedback traffic in situations where a large number of receivers may be synchronized with the BIS events.

The broadcaster 1210 may comprise a wireless communications interface 1216 (also referred to as a BT host controller) comprising baseband processing circuitry 1218 coupled with a wireless network interface 1222 to perform MAC layer (link layer) and physical layer (PHY) functionality for transmitting and receiving communications via, e.g., a BLE channel. In some embodiments, the baseband processing circuitry 1218 may interact with one or more analog devices to perform PHY functionality such as scrambling, encoding, modulating, and the like. In other embodiments, the baseband processing circuitry 1218 may execute code to perform one or more of the PHY functionality such as scrambling, encoding, modulating, and the like.

The MAC layer functionality may execute MAC layer code stored in the memory 1211. In further embodiments, the MAC layer functionality may interface the processor(s) 1201.

The MAC layer functionality may communicate with the PHY to transmit a MAC frame such as a BT frame, in a PHY frame to the receiver 1230. The MAC layer functionality may generate frames such as management, data, and control frames.

The PHY may prepare the MAC frame for transmission by, e.g., determining a preamble to prepend to a MAC frame to create a PHY frame. A wireless network interface 1222 or the baseband processing circuitry 1218 may prepare the PHY frame as a scrambled, encoded, modulated PDU in the time domain signals for the radio 1224. Furthermore, the TSF timer 1205 may provide a timestamp value to indicate the time at which the PDU is transmitted.

After processing the PHY frame, the radio 1224 may impress digital data onto subcarriers of RF frequencies for transmission. A front end module (FEM) 1226 may comprise one or more amplification stages including at least one power amplifier (PA) to amplify the subcarriers of RF frequencies for transmission by electromagnetic radiation via elements of an antenna array or antennas 1228 and via the network 1280 to a receiving device such as the receiver 1230.

The wireless network I/F 1222 also comprises a receiver. The receiver receives electromagnetic energy, extracts the digital data, and the analog PHY and/or the baseband processor 1218 decodes a PHY frame and a MAC frame from a PDU.

The receiver 1230 may receive the BT frame from the broadcaster 1210 via the network 1280. The receiver 1230 may comprise processor(s) 1231 and memory 1241. The processor(s) 1231 may comprise any data processing device such as a microprocessor, a microcontroller, a state machine, and/or the like, and may execute instructions or code in the memory 1241. The memory 1241 may comprise a storage medium such as Dynamic Random Access Memory (DRAM), read only memory (ROM), buffers, registers, cache, flash memory, hard disk drives, solid-state drives, or the like. The memory 1241 may store 1242 the frames, frame structures, frame headers, etc., and may also comprise code to generate, scramble, encode, decode, parse, and interpret MAC frames and/or PHY frames (PDUs).

The receiver 1230 may comprise a wireless communications interface 1246 (also referred to as a BT host controller) comprising baseband processing circuitry 1248 coupled with a wireless network interface 1252 to perform MAC layer (link layer) and physical layer (PHY) functionality for transmitting and receiving communications via, e.g., a BLE channel. The baseband processing circuitry 1248 may comprise a baseband processor and/or one or more circuits to implement a station management entity and the station management entity may interact with a MAC layer management entity to perform MAC layer functionality and a PHY management entity to perform PHY functionality. In such embodiments, the baseband processing circuitry 1248 may interact with processor(s) 1231 to coordinate higher level functionality, such as an application level functionality, with MAC layer and PHY functionality.

In some embodiments, the baseband processing circuitry 1248 may interact with one or more analog devices to perform PHY functionality such as descrambling, decoding, demodulating, and the like. In other embodiments, the baseband processing circuitry 1248 may execute code to perform one or more of the PHY functionalities such as descrambling, decoding, demodulating, and the like.

The receiver 1230 may receive the BT frame at the antennas 1258, which pass the signals along to the FEM 1256. The FEM 1256 may amplify and filter the signals via one or more stages of amplifiers including at least one low noise amplifier (LNA) and one or more stages of filters. The FEM 1256 may pass the signals to the radio 1254. The radio 1254 may filter the carrier signals from the signals and determine if the signals represent a PDU. If so, analog circuitry of the wireless network I/F 1252 or physical layer functionality implemented in the baseband processing circuitry 1248 may demodulate, decode, descramble, etc. the PDU. The baseband processing circuitry 1248 may identify, parse, and interpret the BT frame from PDU.

Figure 1C:
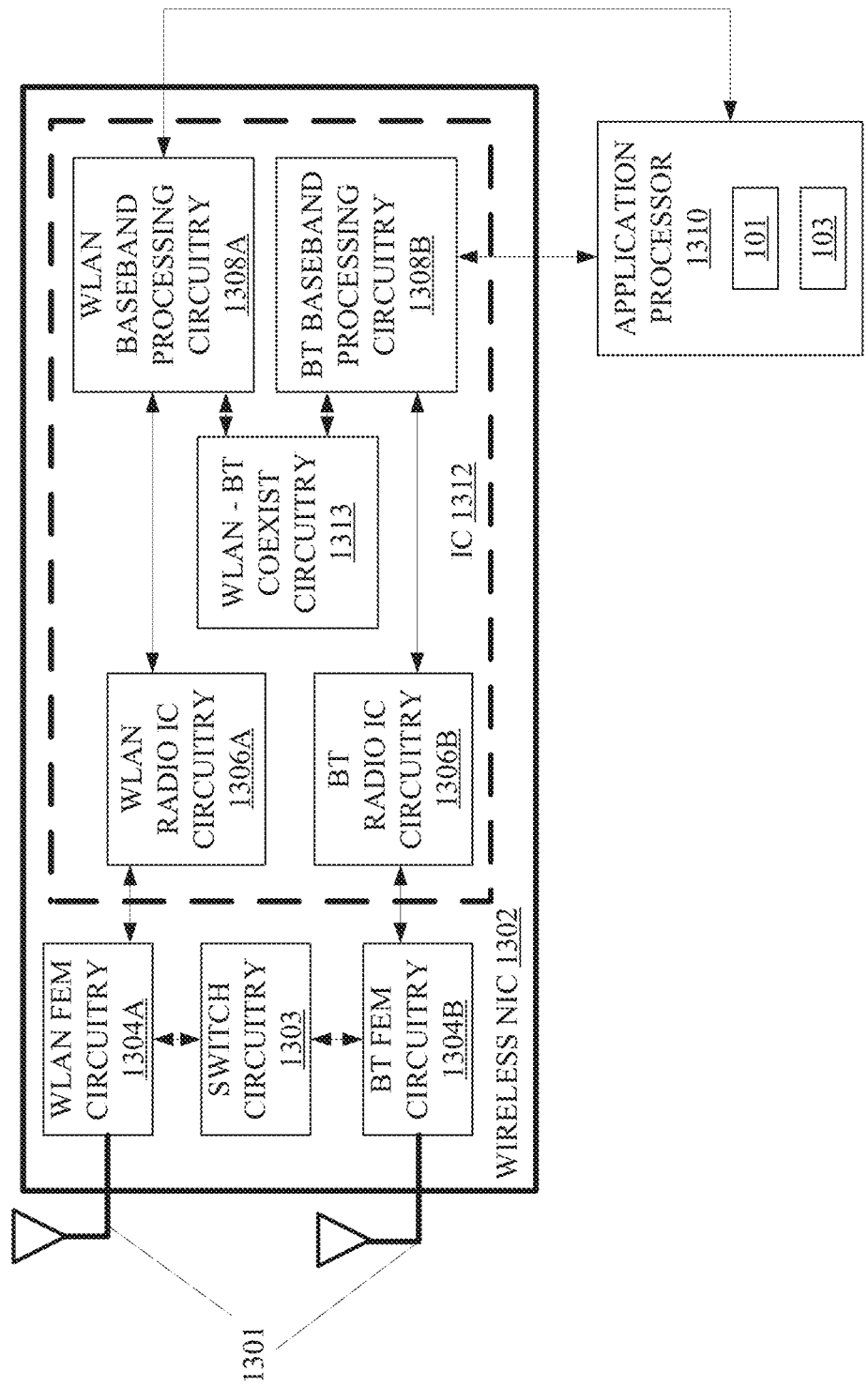
FIG. 1C illustrates an embodiment of a radio architecture for STAs, such as the wireless interfaces for STAs depicted in FIGS. 1A-B, to implement feedback logic circuitry.

FIG. 1C is a block diagram of a radio architecture 1300 such as the wireless communications I/F 1222 and 1252 in accordance with some embodiments that may be implemented in, e.g., the broadcaster 1210 and/or the receiver 1230 of FIG. 1C. The radio architecture 1300 may include radio front-end module (FEM) circuitry 1304a-b, radio IC circuitry 1306a-b and baseband processing circuitry 1308a-b. The radio architecture 1300 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1304a-b may include a WLAN or Wi-Fi FEM circuitry 1304a and a Bluetooth (BT) FEM circuitry 1304b. The WLAN FEM circuitry 1304a may include a receive signal path comprising circuitry configured to operate on WLAN RF signals received from one or more antennas 1301, to amplify the received signals and to provide the amplified versions of the received signals to the WLAN radio IC circuitry 1306a for further processing. The BT FEM circuitry 1304b may include a receive signal path which may include circuitry configured to operate on BT RF signals received from one or more antennas 1301, to amplify the received signals and to provide the amplified versions of the received signals to the BT radio IC circuitry 1306b for further processing. FEM circuitry 1304a may also include a transmit signal path which may include circuitry configured to amplify WLAN signals provided by the radio IC circuitry 1306a for wireless transmission by one or more of the antennas 1301. In addition, FEM circuitry 1304b may also include a transmit signal path which may include circuitry configured to amplify BT signals provided by the radio IC circuitry 1306b for wireless transmission by the one or more antennas. In the embodiment of FIG. 1C, although FEM 1304a and FEM 1304b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1306a-b as shown may include WLAN radio IC circuitry 1306a and BT radio IC circuitry 1306b. The WLAN radio IC circuitry 1306a may include a receive signal path which may include circuitry to down-convert WLAN RF signals received from the FEM circuitry 1304a and provide baseband signals to WLAN baseband processing circuitry 1308a. BT radio IC circuitry 1306b may in turn include a receive signal path which may include circuitry to down-convert BT RF signals received from the FEM circuitry 1304b and provide baseband signals to BT baseband processing circuitry 1308b. WLAN radio IC circuitry 1306a may also include a transmit signal path which may include circuitry to up-convert WLAN baseband signals provided by the WLAN baseband processing circuitry 1308a and provide WLAN RF output signals to the FEM circuitry 1304a for subsequent wireless transmission by the one or more antennas 1301. BT radio IC circuitry 1306b may also include a transmit signal path which may include circuitry to up-convert BT baseband signals provided by the BT baseband processing circuitry 1308b and provide BT RF output signals to the FEM circuitry 1304b for subsequent wireless transmission by the one or more antennas 1301. In the embodiment of FIG. 1C, although radio IC circuitries 1306a and 1306b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1308a-b may include a WLAN baseband processing circuitry 1308a and a BT baseband processing circuitry 1308b. The WLAN baseband processing circuitry 1308a may include a memory, such as, for example, a set of RAM arrays in a Fast Fourier Transform or Inverse Fast Fourier Transform block (not shown) of the WLAN baseband processing circuitry 1308a. Each of the WLAN baseband circuitry 1308a and the BT baseband circuitry 1308b may further include one or more processors and control logic to process the signals received from the corresponding WLAN or BT receive signal path of the radio IC circuitry 1306a-b, and to also generate corresponding WLAN or BT baseband signals for the transmit signal path of the radio IC circuitry 1306a-b. Each of the baseband processing circuitries 1308a and 1308b may further include physical layer (PHY) and medium access control layer (MAC) circuitry (or link layer circuitry), and may further interface with a device for generation and processing of the baseband signals and for controlling operations of the radio IC circuitry 1306a-b.

Referring still to FIG. 1C, according to the shown embodiment, WLAN-BT coexistence circuitry 1313 may include logic providing an interface between the WLAN baseband circuitry 1308a and the BT baseband circuitry 1308b to enable use cases requiring WLAN and BT coexistence. In addition, a switch circuitry 1303 may be provided between the WLAN FEM circuitry 1304a and the BT FEM circuitry 1304b to allow switching between the WLAN and BT radios according to application needs. In addition, although the antennas 1301 are depicted as being respectively connected to the WLAN FEM circuitry 1304a and the BT FEM circuitry 1304b, embodiments include within their scope the sharing of one or more antennas as between the WLAN and BT FEMs, or the provision of more than one antenna connected to each of FEM 1304a or 1304b.

In some embodiments, the front-end module circuitry 1304a-b, the radio IC circuitry 1306a-b, and baseband processing circuitry 1308a-b may be provided on a single radio card, such as wireless network interface card (NIC) 1302. In some other embodiments, the one or more antennas 1301, the FEM circuitry 1304a-b and the radio IC circuitry 1306a-b may be provided on a single radio card. In some other embodiments, the radio IC circuitry 1306a-b and the baseband processing circuitry 1308a-b may be provided on a single chip or integrated circuit (IC), such as IC 1312.

In some embodiments, the wireless NIC 1302 may include a WLAN radio card and may be configured for Wi-Fi communications, although the scope of the embodiments is not limited in this respect. In some of these embodiments, the radio architecture 1300 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1300 may be part of a Wi-Fi communication station (STA) such as a wireless access point (AP), a base station or a mobile device including a Wi-Fi device. In some of these embodiments, radio architecture 1300 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2020, 802.11ay, 802.11ba, 802.11ax, and/or 802.11be standards and/or proposed specifications for WLANs, although the scope of embodiments is not limited in this respect. The radio architecture 1300 may also be suitable to transmit and/or receive communications in accordance with other techniques and standards.

In some embodiments, the radio architecture 1300 may be configured for high-efficiency Wi-Fi (HEW) communications in accordance with the IEEE 802.11ax standard. In these embodiments, the radio architecture 1300 may be configured to communicate in accordance with an OFDMA technique, although the scope of the embodiments is not limited in this respect.

In some other embodiments, the radio architecture 1300 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

Figure 1D:
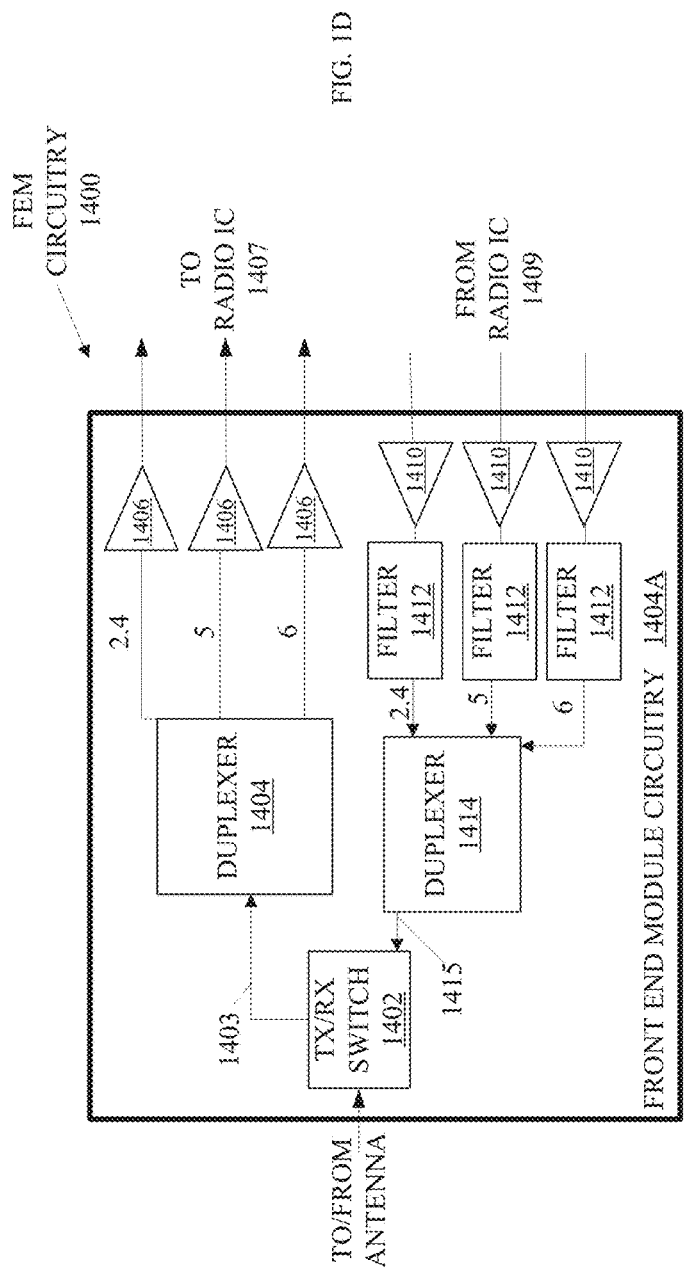
FIG. 1D illustrates an embodiment of front end module (FEM) circuitry of a wireless interface for STAs, such as the STAs in FIGS. 1A-B, to implement feedback logic circuitry.

In some embodiments, as further shown in FIG. 1D, the BT baseband circuitry 1308b may be compliant with a Bluetooth (BT) connectivity specification such as Bluetooth 5.0, or any other iteration of the Bluetooth specification.

In some embodiments, the radio architecture 1300 may include other radio cards, such as a cellular radio card configured for cellular (e.g., 5GPP such as LTE, LTE-Advanced or 7G communications).

In some IEEE 802.11 embodiments, the radio architecture 1300 may be configured for communication over various channel bandwidths including bandwidths having center frequencies of about 2.4 GHz, 5 GHz, and 6 GHz. The various bandwidths may include bandwidths of about 20 MHz, 40 MHz, 80 MHz, 160 MHz, 240 MHz, and 320 MHz with contiguous or non-contiguous bandwidths having increments of 20 MHz, 40 MHz, 80 MHz, 160 MHz, 240 MHz, and 320 MHz. The scope of the embodiments is not limited with respect to the above center frequencies, however.

Figure 1E:
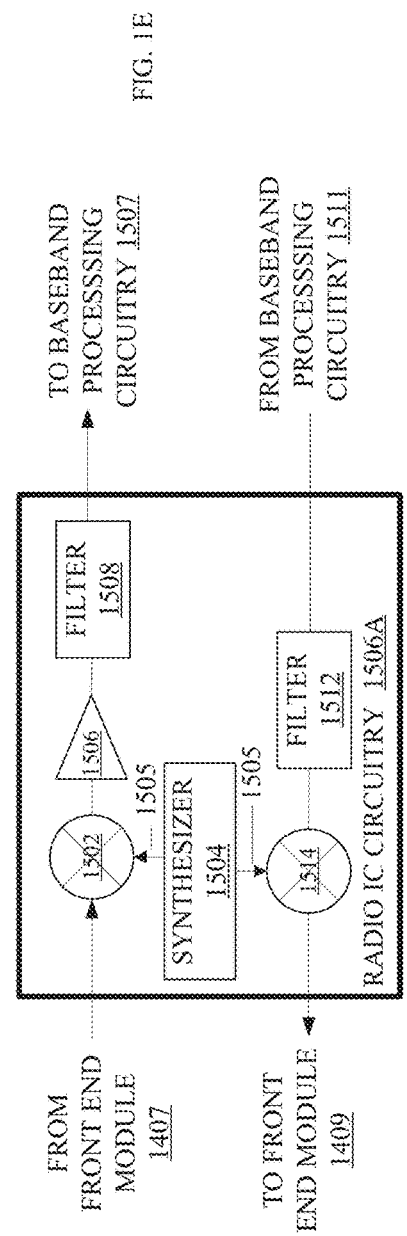
FIG. 1E illustrates an embodiment of radio integrated circuit (IC) circuitry of a wireless interface for STAs, such as the STAs in FIGS. 1A-B, to implement feedback logic circuitry.

FIG. 1D illustrates front end module (FEM) circuitry 1400 such as WLAN FEM circuitry 1304a and/or the BT FEM circuitry 1304b shown in FIG. 1C in accordance with some embodiments. Although the example of FIG. 1E is described in conjunction with the WLAN FEM circuitry 1304a, the example of FIG. 1E may be described in conjunction with other configurations such as the BT FEM circuitry 1304b.

In some embodiments, the FEM circuitry 1400 may include a TX/RX switch 1402 to switch between transmit mode and receive mode operation. The FEM circuitry 1400 may include a receive signal path and a transmit signal path. The receive signal path of the FEM circuitry 1400 may include a low-noise amplifier (LNA) 1406 to amplify received RF signals 1403 and provide the amplified received RF signals 1407 as an output (e.g., to the radio IC circuitry 1306a-b (FIG. 1D)). The transmit signal path of the circuitry 1304a may include a power amplifier (PA) to amplify input RF signals 1409 (e.g., provided by the radio IC circuitry 1306a-b), and one or more filters 1412, such as band-pass filters (BPFs), low-pass filters (LPFs) or other types of filters, to generate RF signals 1415 for subsequent transmission (e.g., by one or more of the antennas 1301 (FIG. 1D)) via an example duplexer 1414.

In some dual-mode embodiments for Wi-Fi communication, the FEM circuitry 1400 may be configured to operate in the 2.4 GHz frequency spectrum, the 5 GHz frequency spectrum, or the 6 GHz frequency spectrum. In these embodiments, the receive signal path of the FEM circuitry

1400 may include a receive signal path duplexer 1404 to separate the signals from each spectrum as well as provide a separate LNA 1406 for each spectrum as shown. In these embodiments, the transmit signal path of the FEM circuitry 1400 may also include a power amplifier 1410 and a filter 1412, such as a BPF, an LPF or another type of filter for each frequency spectrum and a transmit signal path duplexer 1404 to provide the signals of one of the different spectrums onto a single transmit path for subsequent transmission by the one or more of the antennas 1301 (FIG. 1D). In some embodiments, BT communications may utilize the 2.4 GHz signal paths and may utilize the same FEM circuitry 1400 as the one used for WLAN communications.

FIG. 1E illustrates radio integrated circuit (IC) circuitry 1506a in accordance with some embodiments. The radio IC circuitry 1306a is one example of circuitry that may be suitable for use as the WLAN or BT radio IC circuitry 1306a/1306b (FIG. 1D), although other circuitry configurations may also be suitable. Alternatively, the example of FIG. 1F may be described in conjunction with the example BT radio IC circuitry 1306b.

Figure 1F:
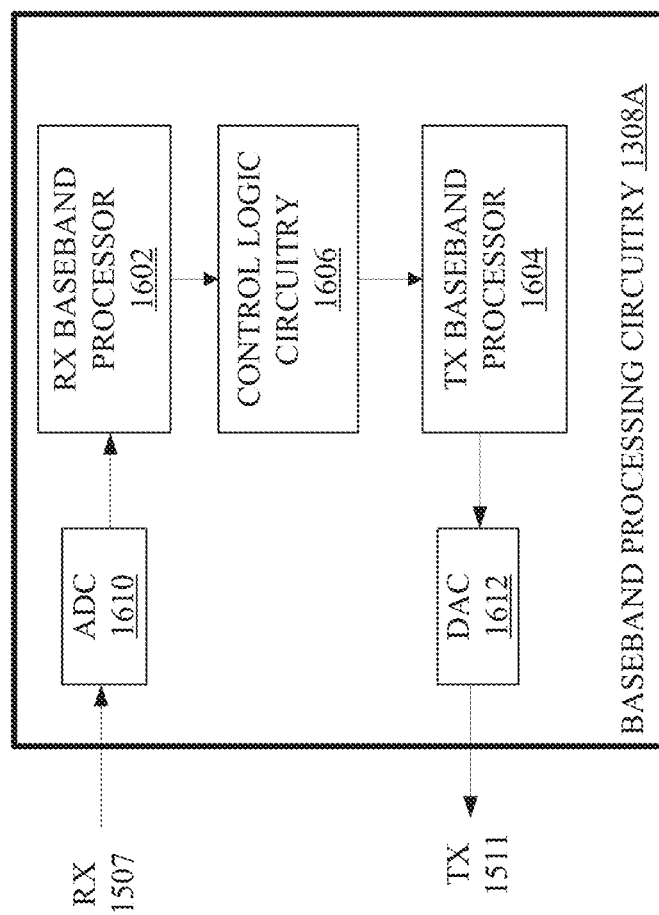
FIG. 1F illustrates an embodiment of baseband processing circuitry of a wireless interface for devices, such as the devices in FIGS. 1A-B, to implement feedback logic circuitry.

In some embodiments, the radio IC circuitry 1306a may include a receive signal path and a transmit signal path. The receive signal path of the radio IC circuitry 1306a may include at least mixer circuitry 1502, such as, for example, down-conversion mixer circuitry, amplifier circuitry 1506 and filter circuitry 1508. The transmit signal path of the radio IC circuitry 1306a may include at least filter circuitry 1512 and mixer circuitry 1514, such as, for example, up-conversion mixer circuitry. Radio IC circuitry 1306a may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 1F illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304a-b (FIG. 1D) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308a-b (FIG. 1D) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1409 for the FEM circuitry 1304a-b. The baseband signals 1511 may be provided by the baseband processing circuitry 1308a-b and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or up-conversion respectively with the help of synthesizer 1504. In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct up-conversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1407 from FIG. 1F may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 1F). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 1E) may comprise a balanced signal, although the scope of the embodiments is not limited in this respect. The I and Q baseband output signals may be provided to low-noise amplifier, such as amplifier circuitry 1506 (FIG. 1F) or to filter circuitry 1508 (FIG. 1F).

In some embodiments, the output baseband signals 1507 and the input baseband signals 1511 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1504 may be provided by a voltage controlled oscillator (VCO), although that is not a requirement. A divider control input may further be provided by either of the baseband processing circuitry 1308a-b (FIG. 1D) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. The application processor 1310 may include, or otherwise be connected to, one of the example secure signal converter 101 or the example received signal converter 103 (e.g., depending on which device the example radio architecture is implemented in).

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

FIG. 1F illustrates a functional block diagram of baseband processing circuitry 1308a in accordance with some embodiments. The baseband processing circuitry 1308a is one example of circuitry that may be suitable for use as the baseband processing circuitry 1308a (FIG. 1D), although other circuitry configurations may also be suitable. Alternatively, the example of FIG. 1F may be used to implement the example BT baseband processing circuitry 1308b of FIG. 1D.

The baseband processing circuitry 1308a may include a receive baseband processor (RX BBP) 1602 for processing receive baseband signals 1509 provided by the radio integrated circuit (IC) circuitry 1306a-b (FIG. 1D) and a transmit baseband processor (TX BBP) 1604 for generating transmit baseband signals 1511 for the radio IC circuitry 1306a-b. The baseband processing circuitry 1308a may also include control logic 1606 for coordinating the operations of the baseband processing circuitry 1308a.

In some embodiments (e.g., when analog baseband signals are exchanged between the baseband processing circuitry 1308a-b and the radio IC circuitry 1306a-b), the baseband processing circuitry 1308a may include ADC 1610 to convert analog baseband signals 1609 received from the radio IC circuitry 1306a-b to digital baseband signals for processing by the RX BBP 1602. In these embodiments, the baseband processing circuitry 1308a may also include digital-to-analog converter (DAC) 1612 to convert digital baseband signals from the TX BBP 1604 to analog baseband signals 1611.

In some embodiments that communicate orthogonal frequency multiplexing (OFDM) signals or orthogonal frequency multiple access (OFDMA) signals, such as through baseband processor 1308a, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Note that other embodiments may use 1 Msym/s modulation and/or 2 Msym/s modulation such as Bluetooth communication protocols.

Referring back to FIG. 1D, in some embodiments, the antennas 1301 (FIG. 1D) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1301 may each include a set of phased-array antennas, although embodiments are not so limited.

Although the radio architecture 1300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

FIG. 2 depicts another embodiment of a communications timeline diagram 2000 to implement feedback logic circuitry such as the feedback logic circuitry described in conjunction with FIGS. 1-8. The feedback logic circuitry may reside in the link layer (also referred to as a MAC layer) and, in some embodiments, also the physical layer (PHY). The feedback logic circuitry may reside in each device connected to an audio stream such as the broadcaster 2002 and the synchronized receivers SR-1 and SR-2. The feedback logic circuitry may provide logic in the form of code and hardware to transmit transmission control feedback request (TX CTRL FDBK_REQ) protocol data units (PDUs) in one or more or every Broadcast Isochronous Stream (BIS) event-N 2020. The communications timeline diagram 2000 shows the TX CTRL FDBK_REQ 2035 at the end of the BIS event-N 2020.

The communications timeline diagram 2000 illustrates a timeline with a single stream known as a BIS (Broadcast Isochronous Stream) 2020 for a broadcaster 2002, such as the broadcaster described in conjunction with FIGS. 1A and 1B, and synchronized receivers, SR-1 and SR-2, according to embodiments. The BIG (Broadcast Isochronous Group) ISO interval 2010 may contain one or more streams known as BIS 2020. Each BIS 2020 may contain one of more subevents which carry audio data for streaming audio. The BIS event-N 2020 comprises two subevents as an example. The purpose of multiple BIS subevents is to unconditionally retransmit the audio payload (TX P0) and to increase the chance of reception. Changing the channels between a series of subevent intervals advantageously provides time diversity and frequency diversity to the audio data to improve chances of reception. Furthermore, each BIS subevent, such as subevent 1 during subevent interval 2025 and subevent 2 during subevent interval 2030, is sent using a different RF channel, channel fn and channel fn+1, respectively.

The presence of the control subevent 2035 is indicated in each BIS packet header. Each BIS PDU may contain a preamble access code, and the control subevent contains an access code that is common to all BIS in a BIG event-N 2015. The RF channel selected for the BIG Control PDU may therefore be known to all BIG synchronized receivers such as SR-1 and SR-2.

Whenever the broadcaster 2002 is signaling the existence of a control subevent in a given BIS event-N 2020 instance (where N represents any integer to number the BIS events), then the broadcaster 2002 may signal in the CTRL subevent 2035 that it wishes to receive feedback reports with a feedback request (FDBK REQ). When the broadcaster 2002 sends the FDBK REQ in the CTRL subevent, the broadcaster 2002 then listens (scans) continuously, in the next few subevents (feedback subevent 2040 on channel fn+X), for a potential transmission from one of the synchronized receivers, SR-1 and SR-2. In some embodiments, the feedback subevent 2040 is on the same channel (fn+x) as the control subevent channel fn+x on which the FB REQ was transmitted. In other embodiments, the feedback subevent 2040 is on a different channel such as the next sequential channel in the AFH channel map (fn+x+1).

The various Synchronized Receivers such as SR-1 and SR-2 may compete on these subevents using a two way back-off mechanism. A first level random back-off may be a biased binary decision whether to transmit (TX) or not in this BIG feedback channel. Synchronized Receivers may count how many times they decided not to transmit in a BIG ISO interval 2010, and use this counter to bias the decision to TRUE (to prevent report starvation).

A second level back-off is within the BIG event-N 2015 in case the first level back off was TRUE. In the case of TRUE result in the first level back-off, a random offset from the control subevent may be selected within a range published by the broadcaster 2002 in the feedback request FDBK REQ) message. The control PDU sent from receivers as a feedback response (FDBK RSP) report, sent in a randomized offset position in relation to the control subevent sent by the broadcaster 2002. Each FDBK_RSP may be sent once from a Synchronized Receiver (SR-1 and SR-2) and may contain received signal strength indicator (RSSI), packet error rate (PER), AFH channel map, and/or the like. When a Synchronized Receiver (SR-1 or SR-2) sends a FDBK RSP, the synchronized receiver may bias the first level back off to FALSE in the next subevent with FDBK REQ (for collision avoidance in future BIG ISO interval 2010). As a result, a broadcaster 2002 may receive multiple FDBK RSP PDU reports from multiple Synchronized Receivers (SR-1 and SR-2), in every BIS event-N 2020 with a control subevent 2035 containing a FDB REQ PDU. The broadcaster 2002 may collect all FDBK RSP PDU reports and determine the optimal power level and AFH channel map based on the various FDBK RSP PDU reports received.

In some embodiments, the synchronized receivers (SR-1 and SR-2) may perform an energy check or packet check to determine if the channel of the feedback subevent is clear and then transmit the FDBK RSP report if the channel is clear. In other embodiments, the synchronized receivers (SR-1 and SR-2) may perform a random backoff count and check to determine if the channel of the feedback subevent is clear and then transmit the FDBK RSP report. If the channel of the feedback subevent is not clear, the synchronized receivers may generate a new random backoff count and attempt to transmit the FDBK RSP report again.

FIG. 3 depicts an embodiment of a flowchart 3000 to implement feedback logic circuitry such as the feedback logic circuitry discussed in FIGS. 1-3. The feedback logic circuitry of the broadcaster may establish a feedback channel for, e.g., reporting issues related to broadcast audio PDUs. At element 3010, the feedback logic circuitry of the broadcaster may cause transmission of an audio protocol data unit (PDU) during each of the one or more subevents.

At element 3015, feedback logic circuitry of the broadcaster (e.g., the feedback logic circuitry 1220 of the broadcaster 1210 shown FIG. 1B) may generate a feedback request frame as a feedback request PDU. In some embodiments, the feedback request PDU may the feedback request PDU (or frame) may comprise a duration of the feedback request PDU and a duration of a feedback subevent.

At element 3020, the broadcaster may cause transmission of the feedback request PDU on a feedback channel. In some embodiments, the broadcaster may implement a Bluetooth wireless communications protocol for causing transmission of the feedback request PDU.

At element 3025, the broadcaster may scan the feedback channel for one or more feedback response PDUs transmitted in response to transmission of the feedback request PDU. In some embodiments, the receiver may process feedback response PDUs scanned during the feedback subevent to determine changes to one or more parameters of transmission of the audio PDUs. For instance, the broadcaster may calculate a distance of each receiver based on the power indicated for receipt of the audio PDU. Based on the distances and power indications, the broadcaster may determine a power level adjustment (or gain) for the transmission of the audio PDU in a subsequent broadcast of an audio PDU.

At element 3030, the broadcaster may modify the one or more parameters of transmission of the audio PDUs in a subsequent broadcast isochronous group (BIG) event based on the one or more feedback response PDUs. In many embodiments, the Broadcaster may determine the optimal power level and AFH channel map based on the various FDBK RSP PDUs received via the feedback channel.

Figure 4:
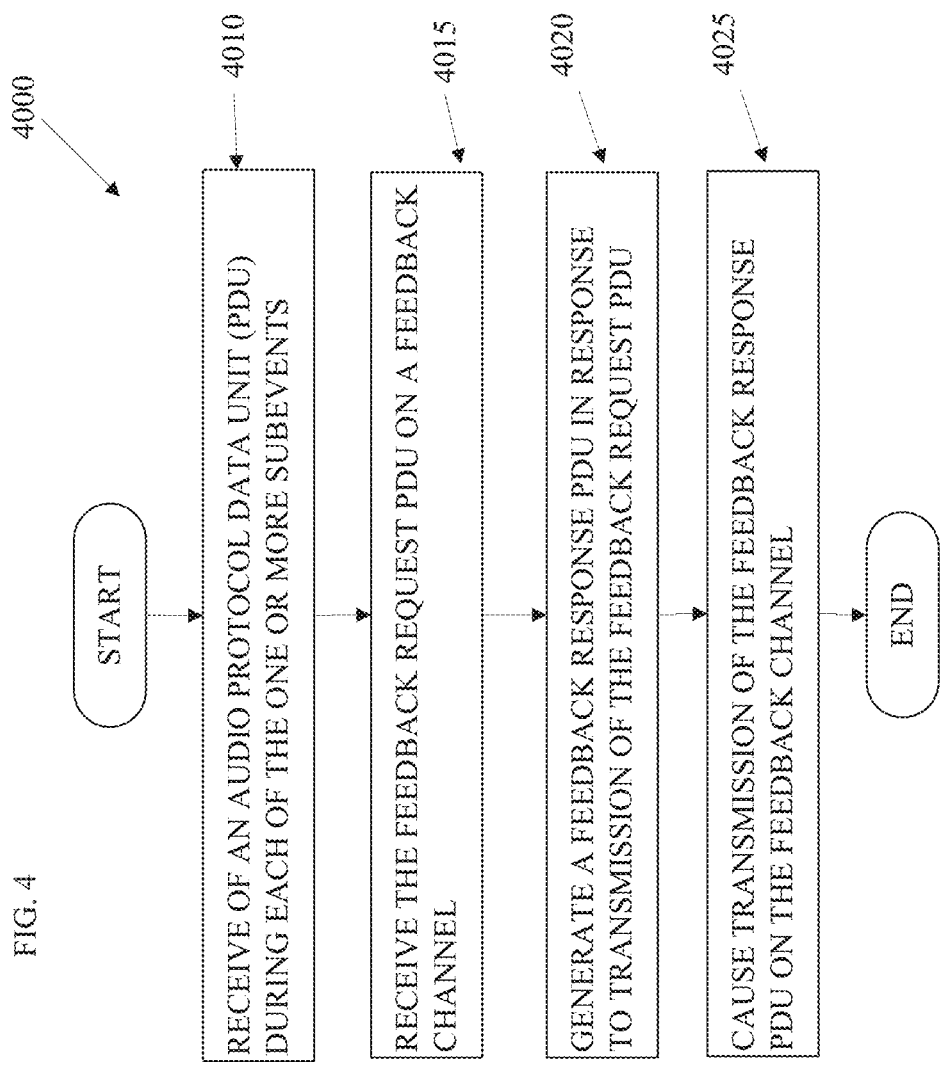
FIG. 4 depicts an embodiment of another flowchart to implement feedback logic circuitry.

FIG. 4 depicts an embodiment of a flowchart 4000 to implement feedback logic circuitry such as the feedback logic circuitry discussed in FIGS. 1-3. At element 4010, feedback logic circuitry of the receiver (e.g., the feedback logic circuitry 1250 of receiver 1230 shown FIG. 1B) may receive of an audio protocol data unit (PDU) during each of the one or more subevents. For instance, the receiver may subscribe to an audio stream and may synchronize with one or more subevents of a broadcast isochronous stream (BIS) event. The BIS event may transmit one or more audio PDUs on different radio frequency (RF) channels to provide frequency diversity. In many embodiments, the receiver may receive the audio PDU via a Bluetooth wireless communications protocol.

At element 4015, the feedback logic circuitry of the receiver may receive the feedback request PDU on a feedback channel. In many embodiments, receiver, after receiving an audio PDF, may receive a request for feedback on a feedback channel.

At element 4020, after the receiver receives the feedback request PDU, the receiver may generate a feedback response PDU in response to transmission of the feedback request PDU. The feedback response PDU may comprise an indication of a power level or a frequency channel associated with transmission of the audio PDU. In some embodiments, receiver may generate a feedback response PDU in response to transmission of the feedback request PDU that comprises metrics such as RSSI (receive signal strength indication), PER (Packet Error Rate), and AFH channel map classifications (Adaptive Frequency Hopping).

At element 4025, the receiver may cause transmission of the feedback response PDU on the feedback channel. In many embodiments, receiver may cause transmission of the feedback response PDU via a Bluetooth wireless communications protocol.

Figure 5:
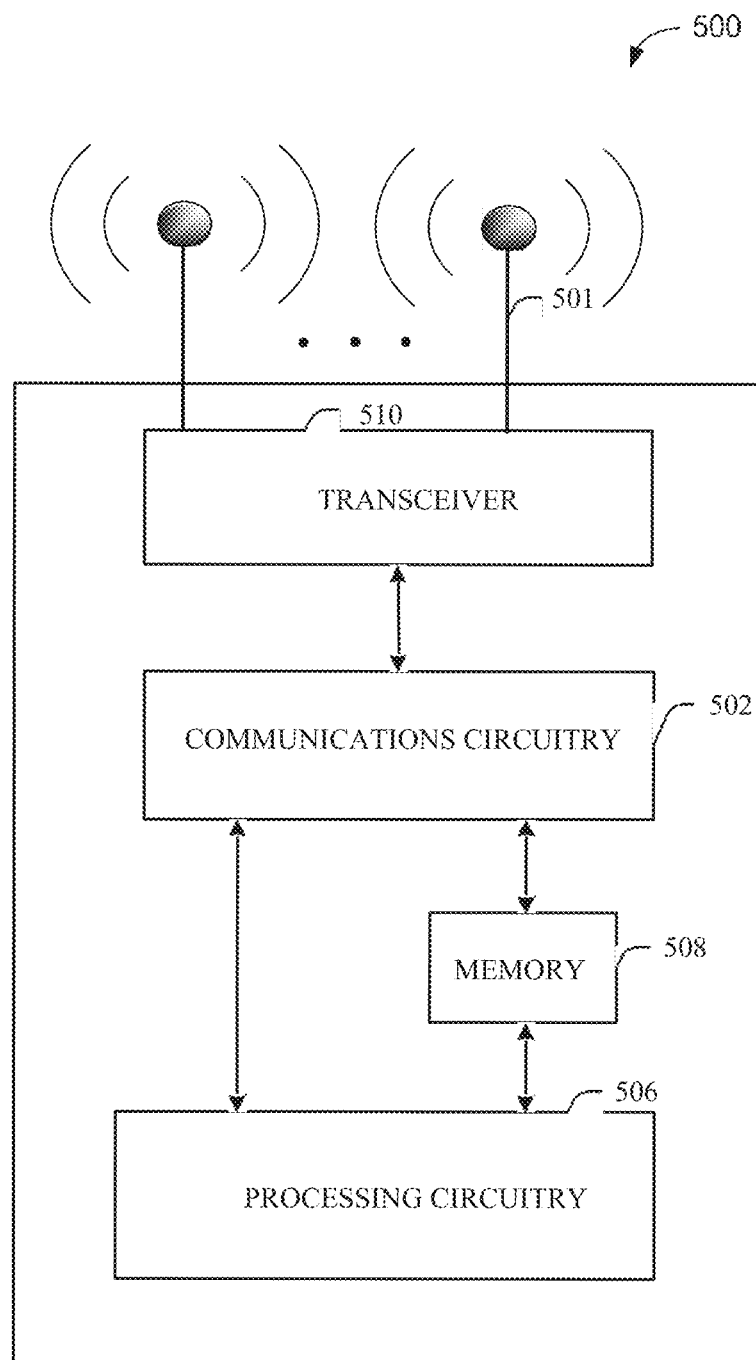
FIG. 5 depicts an embodiment of a functional diagram of a wireless communication device, in accordance with one or more example embodiments of the present disclosure.

FIG. 5 shows a functional diagram of an exemplary communication station 500, in accordance with one or more example embodiments of the present disclosure. In one embodiment, FIG. 5 illustrates a functional block diagram of a broadcaster or receiver that may be suitable for use as an AP 1005 (FIG. 1A) or one of the user devices, such as the tablet 1029 (FIG. 1A) in accordance with some embodiments. The communication station 500 may also be suitable for use as other user device(s) 1020 such as the user devices 1024, 1025, 1026, 1027, and/or 1028. The user devices 1024, 1025, 1026, 1027, 1028, and/or 1029 may include, e.g., a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or link layer communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

Figure 6:
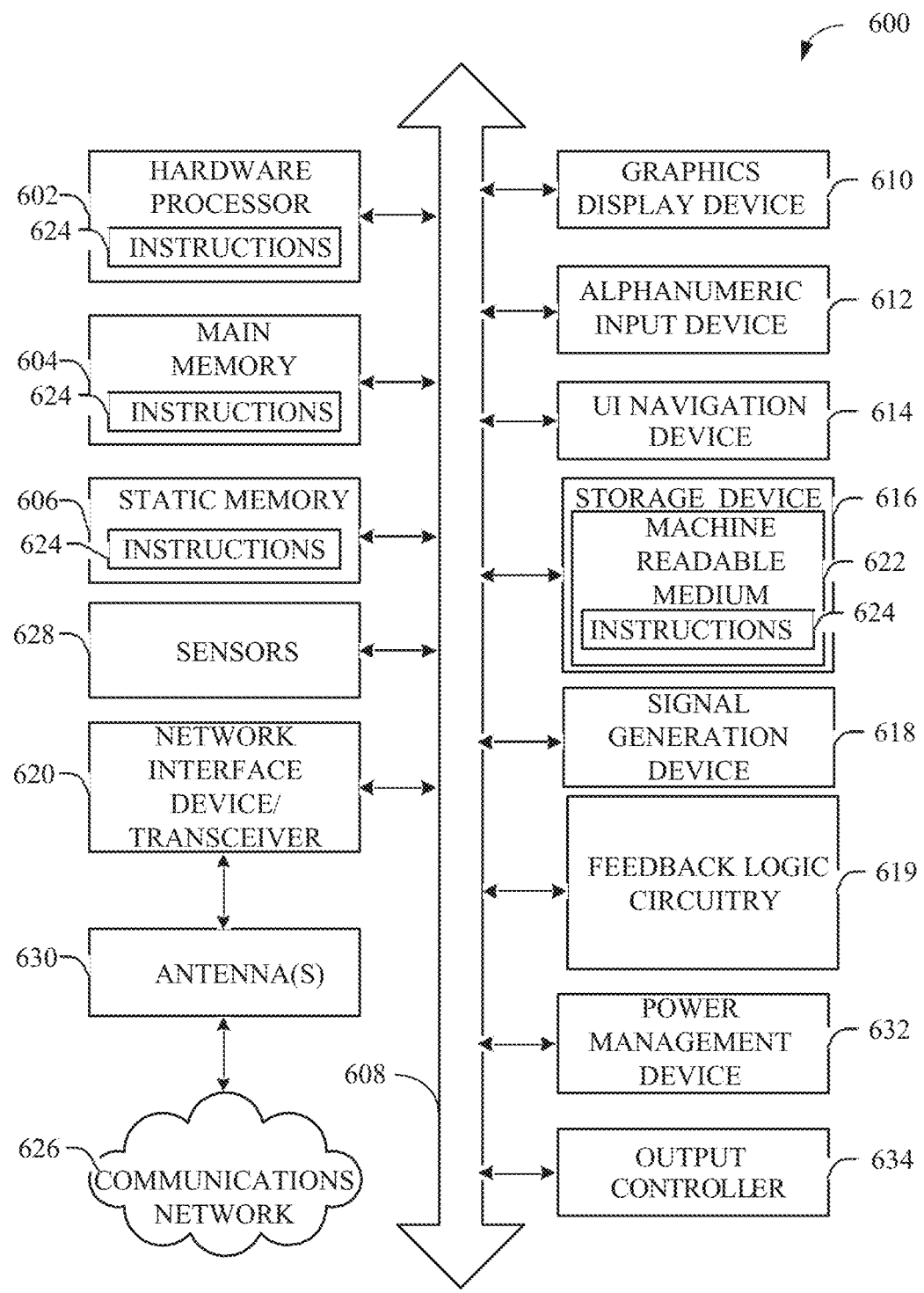
FIG. 6 depicts an embodiment of a block diagram of a machine upon which any of one or more techniques may be performed, in accordance with one or more embodiments.

FIG. 6 illustrates a block diagram of an example of a machine 600 or system upon which any one or more of the techniques (e.g., methodologies) discussed herein may be performed. For instance, the machine may comprise an AP such as the AP 1005 and/or one of the user devices 1020 shown in FIG. 1A. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via one or more interlinks (e.g., buses or high speed interconnects) 608. Note that the single set of interlinks 608 may be representative of the physical interlinks in some embodiments but is not representative of the physical interlinks 608 in other embodiments. For example, the main memory 604 may couple directly with the hardware processor 602 via high speed interconnects or a main memory bus. The high speed interconnects typically connect two devices, and the bus is generally designed to interconnect two or more devices and include an arbitration scheme to provide fair access to the bus by the two or more devices.

The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a feedback logic circuitry 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor such as the baseband processing circuitry 1218 and/or 1248 shown in FIG. 1C. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the feedback logic circuitry 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The feedback logic circuitry 619 may carry out or perform any of the operations and processes in relation to obtaining feedback on a feedback channel based on broadcast PDUs or the like (e.g., flowchart 3000 shown in FIG. 3, and flowchart 4000 shown in FIG. 4) described and shown above. It is understood that the above are only a subset of what the feedback logic circuitry 619 may be configured to perform and that other functions included throughout this disclosure may also be performed by the feedback logic circuitry 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
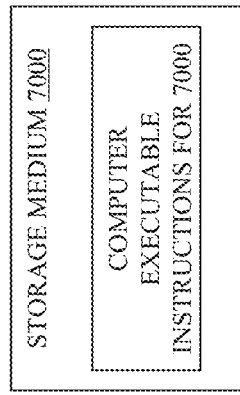
FIGS. 7-8 depict embodiments of a computer-readable storage medium and a computing platform to implement feedback logic circuitry.

FIG. 7 illustrates an example of a storage medium 7000 to store assessment logic such as logic to implement the feedback logic circuitry 619 shown in FIG. 6 and/or the other logic discussed herein to request feedback and establish a feedback channel to provide feedback for broadcast PDUs. Storage medium 7000 may comprise an article of manufacture. In some examples, storage medium 7000 may include any non-transitory computer readable medium or machine-readable medium, such as an optical, magnetic or semiconductor storage. Storage medium 7000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 8:
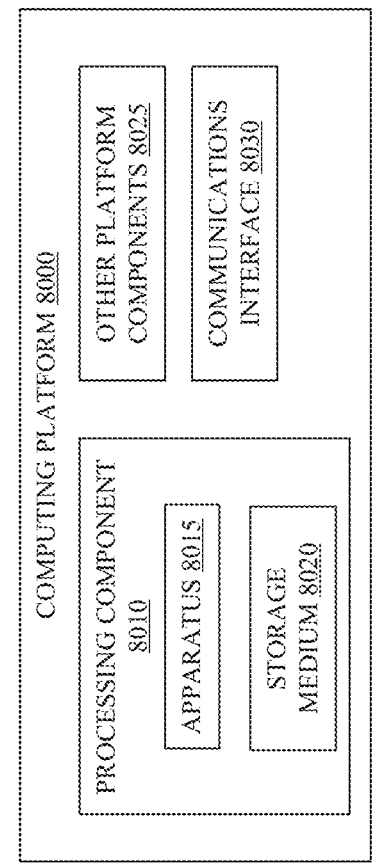

FIG. 8 illustrates an example computing platform 8000 such as the broadcaster 1210 and receiver 1230 in FIG. 1B. In some examples, as shown in FIG. 8, computing platform 8000 may include a processing component 8010, other platform components or a communications interface 8030 such as the wireless network interfaces 1222 and 1252 shown in FIG. 1B. According to some examples, computing platform 8000 may be a computing device such as a server in a system such as a data center or server farm that supports a manager or controller for managing configurable computing resources as mentioned above.

According to some examples, processing component 8010 may execute processing operations or logic for apparatus 8015 described herein. Processing component 8010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 8020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 8025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 8030 may include logic and/or features to support a communication interface. For these examples, communications interface 8030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 8000 may be part of a computing device that may be, for example, a server, a server array or server farm, a web server, a network server, an Internet server, a workstation, a mini-computer, a main frame computer, a supercomputer, a network appliance, a web appliance, a distributed computing system, multiprocessor systems, processor-based systems, or combination thereof. Accordingly, various embodiments of the computing platform 8000 may include or exclude functions and/or specific configurations of the computing platform 8000 described herein.

The components and features of computing platform 8000 may comprise any combination of discrete circuitry, ASICs, logic gates and/or single chip architectures. Further, the features of computing platform 8000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Advantages of Some Embodiments

Several embodiments have one or more potentially advantages effects. For instance, use of feedback logic circuitry, advantageously ability to account for BT devices that are currently receiving audio stream and the distribution of the BT devices across distances from the Broadcaster. Advantages of feedback logic circuitry include higher audio quality and/or lower power consumption. Advantages of feedback logic circuitry include optimal reception of audio PDU in a transmission from the Broadcaster. Advantages of feedback logic circuitry include synchronized receivers having longer battery life when consuming broadcast audio.

EXAMPLES OF FURTHER EMBODIMENTS

The following examples pertain to further embodiments. Specifics in the examples may be used anywhere in one or more embodiments.

Example 1 is an apparatus comprising: a memory; and logic circuitry of a broadcaster coupled with the memory to: cause transmission of an audio protocol data unit (PDU) during each of the one or more subevents; generate a feedback request frame as a feedback request PDU; cause transmission of the feedback request PDU on a feedback channel; scan the feedback channel for one or more feedback response PDUs transmitted in response to transmission of the feedback request PDU; and modify the one or more parameters of transmission of the audio PDUs in a subsequent broadcast isochronous group (BIG) event based on the one or more feedback response PDUs. Example 2 is the apparatus of Example 1, wherein the logic circuitry comprises baseband processing circuitry and further comprising a radio coupled with the baseband processing circuitry, and one or more antennas coupled with the radio to transmit the feedback request PDU. Example 3 is the apparatus of Example 1, the logic circuitry to further initiate a BIG event, the BIG event comprising one or more broadcast isochronous stream (BIS) events, wherein each BIS event comprises one or more subevents. Example 4 is the apparatus of Example 1, the logic circuitry to further process feedback response PDUs scanned during the feedback subevent to determine changes to one or more parameters of transmission of the audio PDUs. Example 5 is the apparatus of Example 1, the audio PDU comprising an audio stream. Example 6 is the apparatus of Example 1, wherein each audio PDU is transmitted on a different channel. Example 7 is the apparatus of Example 1, the feedback request frame to comprise a duration of the feedback request PDU and a duration of a feedback subevent. Example 8 is the apparatus of Example 1, the logic circuitry to implement a Bluetooth wireless communications protocol for causing transmission of an audio PDU during each of the one or more subevents.

Example 9 is a non-transitory computer-readable medium, comprising instructions, which when executed by a processor, cause the processor to perform operations to: cause transmission of an audio protocol data unit (PDU) during each of the one or more subevents; generate a feedback request frame as a feedback request PDU; cause transmission of the feedback request PDU on a feedback channel; scan the feedback channel for one or more feedback response PDUs transmitted in response to transmission of the feedback request PDU; and modify the one or more parameters of transmission of the audio PDUs in a subsequent broadcast isochronous group (BIG) event based on the one or more feedback response PDUs. Example 10 is the non-transitory computer-readable medium of Example 9, the operations to further initiate a BIG event, the BIG event comprising one or more broadcast isochronous stream (BIS) events, wherein each BIS event comprises one or more subevents. Example 11 is the non-transitory computer-readable medium of Example 9, the operations to further process feedback response PDUs scanned during the feedback subevent to determine changes to one or more parameters of transmission of the audio PDUs. Example 12 is the non-transitory computer-readable medium of Example 9, the audio PDU comprising an audio stream. Example 13 is the non-transitory computer-readable medium of Example 9, wherein each audio PDU is transmitted on a different channel. Example 14 is the non-transitory computer-readable medium of Example 9, the feedback request frame to comprise a duration of the feedback request PDU and a duration of a feedback subevent. Example 15 is the non-transitory computer-readable medium of Example 9, the operations to further implement a Bluetooth wireless communications protocol for causing transmission of an audio PDU during each of the one or more subevents.

Example 16 is a method comprising: causing transmission of an audio protocol data unit (PDU) during each of the one or more subevents; generating a feedback request frame as a feedback request PDU; causing transmission of the feedback request PDU on a feedback channel; scanning the feedback channel for one or more feedback response PDUs transmitted in response to transmission of the feedback request PDU; and modifying the one or more parameters of transmission of the audio PDUs in a subsequent broadcast isochronous group (BIG) event based on the one or more feedback response PDUs. Example 17 is the method of Example 16, further comprising initiating a BIG event, the BIG event comprising one or more broadcast isochronous stream (BIS) events, wherein each BIS event comprises one or more subevents. Example 18 is the method of Example 16, further comprising processing feedback response PDUs scanned during the feedback subevent to determine changes to one or more parameters of transmission of the audio PDUs. Example 19 is the method of Example 16, the audio PDU comprising an audio stream. Example 20 is the method of Example 16, wherein each audio PDU is transmitted on a different channel. Example 21 is the method of Example 16, the feedback request frame to comprise a duration of the feedback request PDU and a duration of a feedback subevent. Example 22 is the method of Example 16, further comprising implementing a Bluetooth wireless communications protocol for causing transmission of an audio PDU during each of the one or more subevents.

Example 23 is an apparatus comprising: a means for causing transmission of an audio protocol data unit (PDU) during each of the one or more subevents; a means for generating a feedback request frame as a feedback request PDU; a means for causing transmission of the feedback request PDU on a feedback channel; a means for scanning the feedback channel for one or more feedback response PDUs transmitted in response to transmission of the feedback request PDU; and a means for modifying the one or more parameters of transmission of the audio PDUs in a subsequent broadcast isochronous group (BIG) event based on the one or more feedback response PDUs. Example 24 is the apparatus of Example 23, further comprising a means for initiating a BIG event, the BIG event comprising one or more broadcast isochronous stream (BIS) events, wherein each BIS event comprises one or more subevents. Example 25 is the apparatus of Example 24, further comprising a means for processing feedback response PDUs scanned during the feedback subevent to determine changes to one or more parameters of transmission of the audio PDUs. Example 26 is the apparatus of Example 23, the audio PDU comprising an audio stream. Example 27 is the apparatus of Example 26, wherein each audio PDU is transmitted on a different channel. Example 28 is the apparatus of Example 23, the feedback request frame to comprise a duration of the feedback request PDU and a duration of a feedback subevent. Example 29 is the apparatus of Example 23, further comprising a means for implementing a Bluetooth wireless communications protocol for causing transmission of an audio PDU during each of the one or more subevents.

Example 30 is an apparatus comprising: a memory; and logic circuitry of a receiver coupled with the memory to: receive of an audio protocol data unit (PDU) during each of the one or more subevents; receive the feedback request PDU on a feedback channel; generate a feedback response PDU in response to transmission of the feedback request PDU; and cause transmission of the feedback response PDU on the feedback channel. Example 31 is the apparatus of Example 30, wherein the logic circuitry comprises baseband processing circuitry and further comprising a radio coupled with the baseband processing circuitry, and one or more antennas coupled with the radio to receive the audio PDU. Example 32 is the apparatus of Example 30, the logic circuitry to synchronize with one or more subevents of a broadcast isochronous stream (BIS) event. Example 33 is the apparatus of Example 32, wherein the feedback response PDU comprises an indication of a power level or a frequency channel associated with transmission of the audio PDU. Example 34 is the apparatus of Example 30, the audio PDU comprising an audio stream wherein each audio PDU is transmitted on a different channel. Example 35 is the apparatus of Example 30, wherein the audio PDU is received via a Bluetooth wireless communications protocol.

Example 36 is a non-transitory computer-readable medium, comprising instructions, which when executed by a processor, cause the processor to perform operations to: receive of an audio protocol data unit (PDU) during each of the one or more subevents; receive the feedback request PDU on a feedback channel; generate a feedback response PDU in response to transmission of the feedback request PDU; and cause transmission of the feedback response PDU on the feedback channel. Example 37 is the non-transitory computer-readable medium of Example 36, the operations to further synchronize with one or more subevents of a broadcast isochronous stream (BIS) event. Example 38 is the non-transitory computer-readable medium of Example 37, wherein the feedback response PDU comprises an indication of a power level or a frequency channel associated with transmission of the audio PDU. Example 39 is the non-transitory computer-readable medium of Example 36, the audio PDU comprising an audio stream wherein each audio PDU is transmitted on a different channel. Example 40 is the non-transitory computer-readable medium of Example 36, wherein the audio PDU is received via a Bluetooth wireless communications protocol.

Example 41 is a method comprising: receiving of an audio protocol data unit (PDU) during each of the one or more subevents; receiving the feedback request PDU on a feedback channel; generating a feedback response PDU in response to transmission of the feedback request PDU; and causing transmission of the feedback response PDU on the feedback channel. Example 42 is the method of Example 41, further comprising synchronizing with one or more subevents of a broadcast isochronous stream (BIS) event. Example 43 is the method of Example 42, wherein the feedback response PDU comprises an indication of a power level or a frequency channel associated with transmission of the audio PDU. Example 44 is the method of Example 41, the audio PDU comprising an audio stream wherein each audio PDU is transmitted on a different channel. Example 45 is the method of Example 41, wherein the audio PDU is received via a Bluetooth wireless communications protocol.

Example 46 is an apparatus comprising: a means for receiving of an audio protocol data unit (PDU) during each of the one or more subevents; a means for receiving the feedback request PDU on a feedback channel; a means for generating a feedback response PDU in response to transmission of the feedback request PDU; and a means for causing transmission of the feedback response PDU on the feedback channel. Example 47 is the apparatus of Example 46, further comprising a means for synchronizing with one or more subevents of a broadcast isochronous stream (BIS) event. Example 48 is the apparatus of Example 46, wherein the feedback response PDU comprises an indication of a power level or a frequency channel associated with transmission of the audio PDU. Example 49 is the apparatus of Example 46, the audio PDU comprising an audio stream wherein each audio PDU is transmitted on a different channel. Example 50 is the apparatus of Example 46, wherein the audio PDU is received via a Bluetooth wireless communications protocol.

What is claimed is:

1. An apparatus comprising:
   a memory; and
   circuitry of a broadcaster coupled with the memory to:
   cause transmission of an audio protocol data unit (PDU) during each of one or more subevents;
   generate a feedback request frame as a feedback request PDU;
   cause transmission of the feedback request PDU on a feedback channel;
   scan the feedback channel for one or more feedback response PDUs transmitted in response to transmission of the feedback request PDU; and
   modify one or more parameters of transmission of the audio PDUs in a subsequent broadcast isochronous group (BIG) event based on the one or more feedback response PDUs.

2. The apparatus of claim 1, wherein the circuitry comprises baseband processing circuitry and further comprising a radio coupled with the baseband processing circuitry, and one or more antennas coupled with the radio to transmit the feedback request PDU.

3. The apparatus of claim 1, the circuitry to further initiate a BIG event, the BIG event comprising one or more broadcast isochronous stream (BIS) events, wherein each BIS event comprises the one or more subevents.

4. The apparatus of claim 1, the circuitry to further process feedback response PDUs scanned during a feedback subevent to determine changes to the one or more parameters of transmission of the audio PDUs.

5. The apparatus of claim 1, the audio PDU comprising an audio stream.

6. The apparatus of claim 1, wherein each audio PDU is transmitted on a different channel.

7. The apparatus of claim 1, the feedback request frame to comprise a duration of the feedback request PDU and a duration of a feedback subevent.

8. The apparatus of claim 1, the circuitry to implement a Bluetooth wireless communications protocol for causing transmission of an audio PDU during each of the one or more subevents.

9. A non-transitory computer-readable medium, comprising instructions, which when executed by a processor, cause the processor to perform operations to:
   cause transmission of an audio protocol data unit (PDU) during each of one or more subevents;

generate a feedback request frame as a feedback request PDU;

cause transmission of the feedback request PDU on a feedback channel;

scan the feedback channel for one or more feedback response PDUs transmitted in response to transmission of the feedback request PDU; and modify one or more parameters of transmission of the audio PDUs in a subsequent broadcast isochronous group (BIG) event based on the one or more feedback response PDUs.

10. The non-transitory computer-readable medium of claim 9, the operations to further initiate a BIG event, the BIG event comprising one or more broadcast isochronous stream (BIS) events, wherein each BIS event comprises the one or more subevents.

11. The non-transitory computer-readable medium of claim 9, the operations to further process feedback response PDUs scanned during a feedback subevent to determine changes to the one or more parameters of transmission of the audio PDUs.

12. The non-transitory computer-readable medium of claim 9, the audio PDU comprising an audio stream.

13. The non-transitory computer-readable medium of claim 9, wherein each audio PDU is transmitted on a different channel.

14. The non-transitory computer-readable medium of claim 9, the feedback request frame to comprise a duration of the feedback request PDU and a duration of a feedback subevent.

15. The non-transitory computer-readable medium of claim 9, the operations to further implement a Bluetooth wireless communications protocol for causing transmission of an audio PDU during each of the one or more subevents.

16. An apparatus comprising:
a memory; and
circuitry of a receiver coupled with the memory to:
receive of an audio protocol data unit (PDU) during each of one or more subevents;
receive a feedback request PDU on a feedback channel;
generate a feedback response PDU in response to transmission of the feedback request PDU; and
cause transmission of the feedback response PDU on the feedback channel.

17. The apparatus of claim 16, wherein the circuitry comprises baseband processing circuitry and further comprising a radio coupled with the baseband processing circuitry, and one or more antennas coupled with the radio to receive the audio PDU.

18. The apparatus of claim 16, the circuitry to synchronize with the one or more subevents of a broadcast isochronous stream (BIS) event.

19. The apparatus of claim 16, wherein the feedback response PDU comprises an indication of a power level or a frequency channel associated with transmission of the audio PDU.

20. The apparatus of claim 16, the audio PDU comprising an audio stream wherein each audio PDU is transmitted on a different channel.

21. The apparatus of claim 16, wherein the audio PDU is received via a Bluetooth wireless communications protocol.

22. A non-transitory computer-readable medium, comprising instructions, which when executed by a processor, cause the processor to perform operations to:
receive of an audio protocol data unit (PDU) during each of one or more subevents;
receive a feedback request PDU on a feedback channel;
generate a feedback response PDU in response to transmission of the feedback request PDU; and
cause transmission of the feedback response PDU on the feedback channel.

23. The non-transitory computer-readable medium of claim 22, the operations to further synchronize with the one or more subevents of a broadcast isochronous stream (BIS) event.

24. The non-transitory computer-readable medium of claim 22, wherein the feedback response PDU comprises an indication of a power level or a frequency channel associated with transmission of the audio PDU.

25. The non-transitory computer-readable medium of claim 22, the audio PDU comprising an audio stream wherein each audio PDU is transmitted on a different channel.

* * * * *